(12) United States Patent
Kim et al.

(10) Patent No.: US 11,479,192 B2
(45) Date of Patent: Oct. 25, 2022

(54) LOWER VEHICLE BODY STRUCTURE OF VEHICLE

(71) Applicants: Hyundai Motor Company, Seoul (KR); Kia Motors Corporation, Seoul (KR)

(72) Inventors: Yeonho Kim, Seoul (KR); Sungil Kim, Hwaseong-si (KR); Deok Ki Kim, Hwaseong-si (KR); Jeawan Kim, Hwaseong-si (KR); Jae Yeon Kim, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 201 days.

(21) Appl. No.: 17/091,994

(22) Filed: Nov. 6, 2020

(65) Prior Publication Data

US 2022/0055561 A1 Feb. 24, 2022

(30) Foreign Application Priority Data

Aug. 18, 2020 (KR) .......................... 10-2020-0103015

(51) Int. Cl.
*B60R 16/08* (2006.01)
*B62D 21/02* (2006.01)

(52) U.S. Cl.
CPC .............. *B60R 16/08* (2013.01); *B62D 21/02* (2013.01)

(58) Field of Classification Search
CPC ...... B60R 16/08; B62D 21/02; B62D 29/008; B62D 21/17; B60H 1/00571

USPC ............................ 296/205, 208, 203.01, 204
See application file for complete search history.

(56) References Cited

U.S. PATENT DOCUMENTS

| 1,913,524 | A | * | 6/1933 | Ulrich | ..................... | B60T 11/04 |
| | | | | | | 188/204 R |
| 3,078,116 | A | * | 2/1963 | West | ................... | B62D 25/2036 |
| | | | | | | 296/97.23 |
| 3,333,552 | A | * | 8/1967 | Reynolds | ................... | B61F 1/00 |
| | | | | | | 105/422 |
| 3,420,390 | A | * | 1/1969 | Taggart | ..................... | B60D 1/54 |
| | | | | | | 280/421 |
| 3,494,657 | A | * | 2/1970 | Johnw | ..................... | B62D 21/17 |
| | | | | | | 280/421 |
| 3,681,883 | A | * | 8/1972 | Ehrlich | ............... | B62D 25/2054 |
| | | | | | | 52/592.1 |
| 4,653,799 | A | * | 3/1987 | Arai | ......................... | B60J 5/047 |
| | | | | | | 49/248 |
| 4,658,854 | A | * | 4/1987 | Hopkins | .................. | F16L 3/223 |
| | | | | | | 280/421 |

(Continued)

*Primary Examiner* — D Glenn Dayoan
*Assistant Examiner* — E Turner Hicks
(74) *Attorney, Agent, or Firm* — Morgan, Lewis & Bockius LLP

(57) ABSTRACT

A lower vehicle body structure of the vehicle may include a side member extending in a longitudinal direction of a vehicle, disposed on both sides in a width direction of the vehicle and having a closed cross-section formed therein; a connecting member connected to the side member at a front or a rear based on front and rear directions of the vehicle and having a closed cross-section formed therein; and at least one pipe unit provided inside in the longitudinal direction of the side member or the connecting member to inflow a working fluid therein.

10 Claims, 4 Drawing Sheets

(56) References Cited

U.S. PATENT DOCUMENTS

| | | | | |
|---|---|---|---|---|
| 4,703,948 A * | 11/1987 | Ehrlich | B62D 21/17 | 105/422 |
| 5,085,485 A * | 2/1992 | Wurl | E04C 3/06 | 52/843 |
| 5,102,187 A * | 4/1992 | Harasaki | B62D 25/20 | 296/204 |
| 5,467,827 A * | 11/1995 | McLoughlin | A62C 27/00 | 414/535 |
| 5,501,289 A * | 3/1996 | Nishikawa | H01M 50/20 | 280/783 |
| 5,551,824 A * | 9/1996 | Zanzig | B65F 3/00 | 414/525.5 |
| 5,813,491 A * | 9/1998 | Sato | B62D 25/2072 | 180/69.1 |
| 6,270,150 B1 * | 8/2001 | Miller | B62D 21/17 | 296/184.1 |
| 6,689,446 B2 * | 2/2004 | Barnes | B60R 16/0215 | 296/146.7 |
| 6,786,291 B1 * | 9/2004 | Linden | B62D 35/02 | 296/180.1 |
| 6,955,394 B1 * | 10/2005 | Reddig | B62D 25/142 | 296/72 |
| 7,270,346 B2 * | 9/2007 | Rowe | B60G 17/04 | 280/781 |
| 7,900,998 B2 * | 3/2011 | Onoda | B62D 25/2036 | 296/208 |
| 8,336,679 B2 * | 12/2012 | Mears | B60T 11/046 | 296/205 |
| 8,480,166 B1 * | 7/2013 | Readwin | B60H 1/246 | 296/208 |
| 8,678,325 B2 * | 3/2014 | Arzate-Engels | F16L 3/222 | 248/68.1 |
| 8,701,811 B2 * | 4/2014 | Robinson | B60K 1/04 | 180/68.5 |
| 8,936,303 B2 * | 1/2015 | Awakawa | H02G 3/0462 | 296/208 |
| 9,004,581 B2 * | 4/2015 | Tokuda | B62D 25/20 | 296/193.07 |
| 9,302,708 B2 * | 4/2016 | Ingels | B62D 21/20 | |
| 10,232,889 B2 * | 3/2019 | Kellner | H02G 3/045 | |
| 10,906,588 B2 * | 2/2021 | Gong | B60J 9/00 | |
| 11,358,652 B2 * | 6/2022 | Storz | B62D 25/2054 | |
| 2005/0161267 A1 * | 7/2005 | Elson | B62D 21/16 | 180/69.5 |
| 2005/0253423 A1 * | 11/2005 | Wolf | B62D 25/145 | 296/208 |
| 2006/0071466 A1 * | 4/2006 | Rowe | B62D 21/17 | 280/782 |
| 2007/0246278 A1 * | 10/2007 | Honzek | B62D 21/17 | 180/311 |
| 2014/0170342 A1 * | 6/2014 | Peitz | B62D 29/005 | 428/209 |
| 2017/0217392 A1 * | 8/2017 | Hoffmann | B60H 1/00521 | |
| 2020/0255068 A1 * | 8/2020 | De Smidt | B60R 16/0215 | |
| 2021/0016836 A1 * | 1/2021 | Moss | B62D 27/065 | |
| 2022/0135143 A1 * | 5/2022 | Abe | B62D 25/00 | 296/203.01 |

* cited by examiner

LOWER VEHICLE BODY STRUCTURE OF VEHICLE

CROSS-REFERENCE TO RELATED APPLICATION

The present application claims priority to Korean Patent Application No. 10-2020-0103015 filed on Aug. 18, 2020, the entire contents of which is incorporated herein for all purposes by this reference.

BACKGROUND OF THE INVENTION

Field of the Invention

The present invention relates to a lower vehicle body structure of a vehicle. More particularly, the present invention relates to a lower vehicle body structure of a vehicle equipped with a pipe through which a working fluid such as a coolant or refrigerant flows.

Description of Related Art

In general, in a lower vehicle body of a vehicle, side members formed to extend along front and rear directions of the vehicle are disposed to both sides in the width direction of the vehicle body of the vehicle to reinforce structural strength of the vehicle body.

Meanwhile, an electric vehicle as a general term for vehicles moving by electric power including a hybrid electric vehicle is provided with the lower vehicle body, and a high-capacity battery is mounted on a floor panel that forms the bottom surface of the vehicle body.

Furthermore, driving devices are mounted on the front or rear of the electric vehicle corresponding to the front and rear wheels, respectively.

The electric vehicle configured as described above includes an air conditioner for controlling an indoor temperature of the vehicle, and a cooling apparatus of cooling electrical components such as a driving device and a battery.

However, in the conventional electric vehicle as described above, the air conditioner and the cooling apparatus may have a plurality of pipes to circulate each working fluid, but it is difficult to avoid interference with the vehicle body and to select a path within a narrow space, and there is a problem that the layout of the pipes becomes complicated.

Furthermore, a cost is increased due to an application of a separate bracket to fix each pipe to the vehicle body, and there is also a problem that it is difficult to apply an automated process because the fixing work of the bracket is required to be suitable to the pipe positions disposed variously for each vehicle type.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a lower vehicle body structure of a vehicle, in which a pipe unit in which a working fluid such as a coolant or refrigerant flows is provided inside to form a lower vehicle body, preventing interference occurrence with vehicle parts and simplifying the layout of the pipe.

A lower vehicle body structure of a vehicle may include a side member extending in a longitudinal direction of a vehicle, disposed on both sides in a width direction of the vehicle and having a closed cross-section formed therein; a connecting member connected to the side member at a front or a rear based on front and rear directions of the vehicle and having a closed cross-section formed therein; and at least one pipe unit provided inside in the longitudinal direction of the side member or the connecting member to inflow a working fluid therein.

At least one pipe unit may include: at least one pipe member formed in a hollow shape and provided inside the side member or the connecting member; a pipe connecting member mounted at a position to which the at least one pipe member is connected; and a length variable member coupled to the at least one pipe member through the pipe connecting member and having a variable length.

The length variable member may include at least one bending portion, and a bellows portion formed on one or more bending portions among the at least one bending portion and having a variable length.

The side member or the connecting member may further include at least one fixing member provided inside in the longitudinal direction of the side member or the connecting member to fix the at least one pipe member.

The side member or the connecting member may be extruded and molded.

The side member or the connecting member may have an interior which is partitioned by at least one rib so that the at least one pipe unit is disposed therein.

At least one rib may include a transverse rib connecting an inside and an outside of the side member or the connecting member based on the width direction of the vehicle thereof, and a longitudinal rib connecting an upper portion and a lower portion of the side member or the connecting member based on a height direction of the vehicle thereof.

The transverse rib and the longitudinal rib may cross each other.

One of the side member, the connecting member, the transverse rib, or the longitudinal rib may have at least one exhaust hole formed to exhaust condensed water generated by a temperature difference to an outside from the at least one pipe unit.

As above-described, according to the lower vehicle body structure for the vehicle according to various exemplary embodiments of the present invention, the pipe unit through which the working fluid such as a coolant or refrigerant flows is provided inside to configure the lower vehicle body, it is possible to prevent the interference occurrence between the pipes and the parts provided in the vehicle in advance, the selection of the path of the pipe becomes advantageous, and the layout of the pipe may be simplified.

Furthermore, the present invention may be commonly applied to a vehicle type that utilizes the same lower vehicle body, a bracket that was applied according to the path of the pipe to fix the conventional pipes may be minimized, and separate bracket fixing work is not required, the application of an automated process may be possible.

Furthermore, since the present invention does not require securing a pipe installation space, a sufficient space for mounting a battery may be secured, and it may be applied to a large capacity battery.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
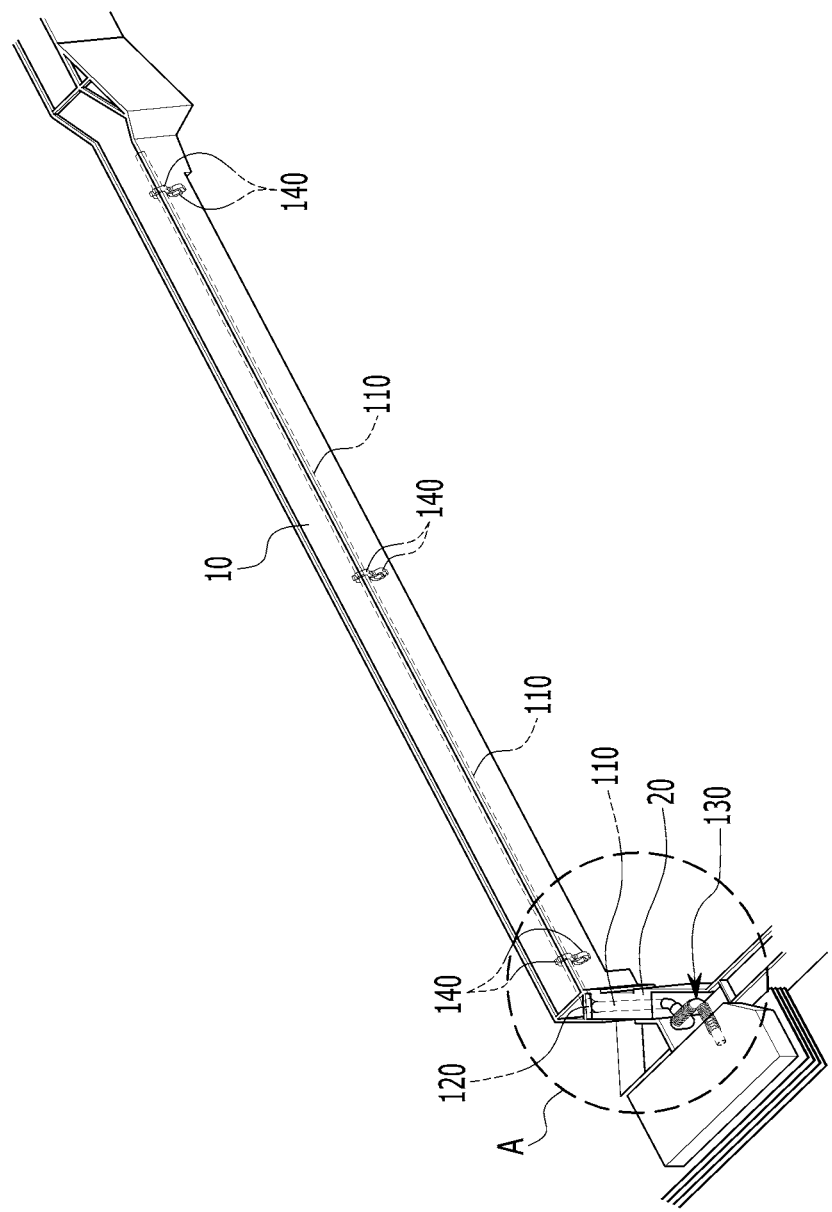
FIG. 1 is a projection perspective view of a lower vehicle body structure of a vehicle according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Various exemplary embodiments of the present invention will hereinafter be described in detail with reference to the accompanying drawings.

Prior to the detailed description, while the present invention will be described in connection with what is presently considered to be practical exemplary embodiments of the present invention, it is to be understood that the present invention is not limited to the disclosed exemplary embodiments of the present invention, but On the other hand, is directed to cover various modifications and equivalent claims as well as various alternatives and modifications thereof. It is intended that the scope of the present invention be defined by the Claims appended hereto and their equivalents."

To clarify the present invention, parts that are not connected with the description will be omitted, and the same elements or equivalents are referred to by the same reference numerals throughout the specification.

The size and thickness of each element are arbitrarily shown in the drawings, and the present invention is not necessarily limited thereto, and in the drawings, the thickness of layers, films, panels, regions, etc., are exaggerated for clarity.

Furthermore, unless explicitly described to the contrary, the word "comprise", and variations such as "comprises" or "comprising", will be understood to imply the inclusion of stated elements but not the exclusion of any other elements.

Furthermore, the terms " . . . unit", " . . . mechanism", " . . . portion", " . . . member", etc. used herein mean a unit of inclusive components performing one or more functions or operations.

Figure 2:
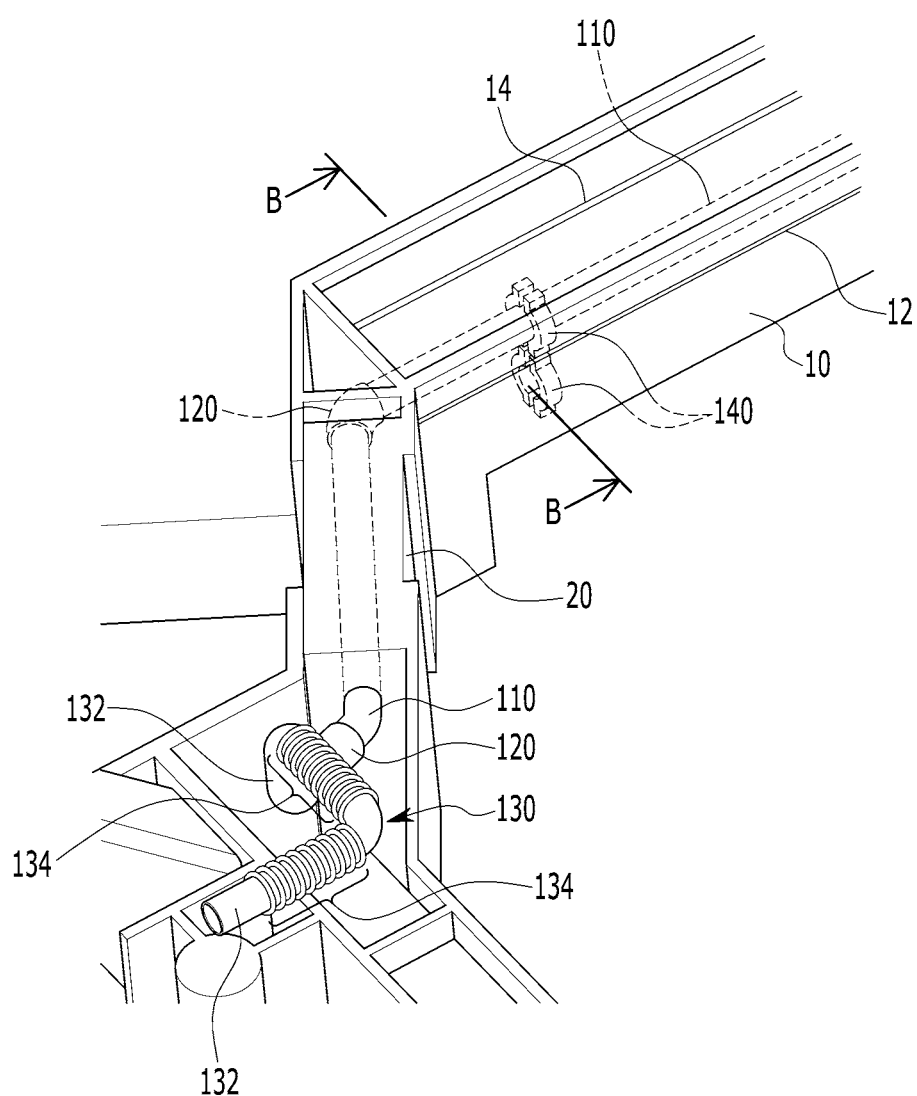
FIG. 2 is an enlarged view of a portion A of FIG. 1.
Figure 3:
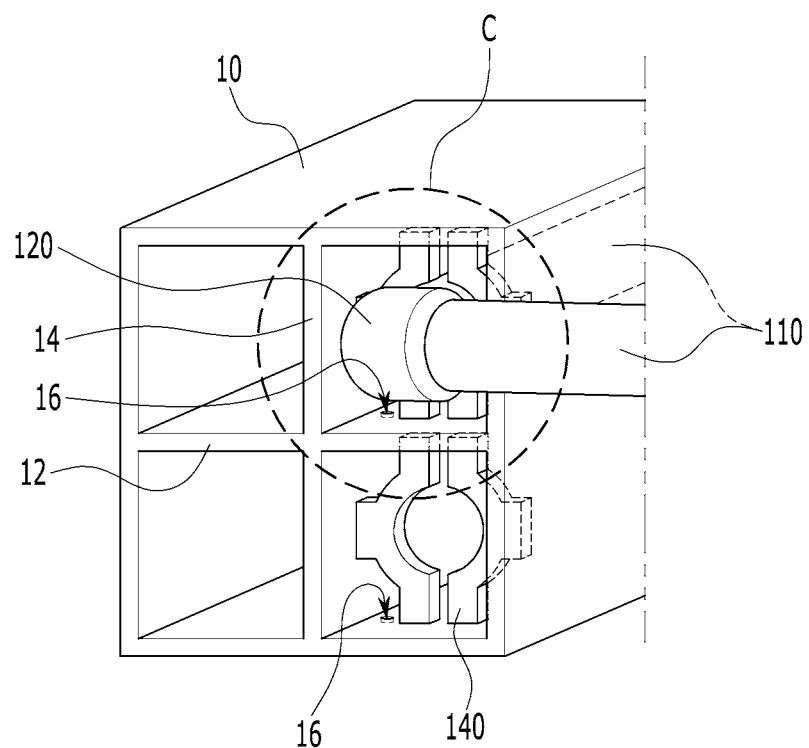
FIG. 3 is a cross-section perspective view taken along a line B-B of FIG. 2.
Figure 4:
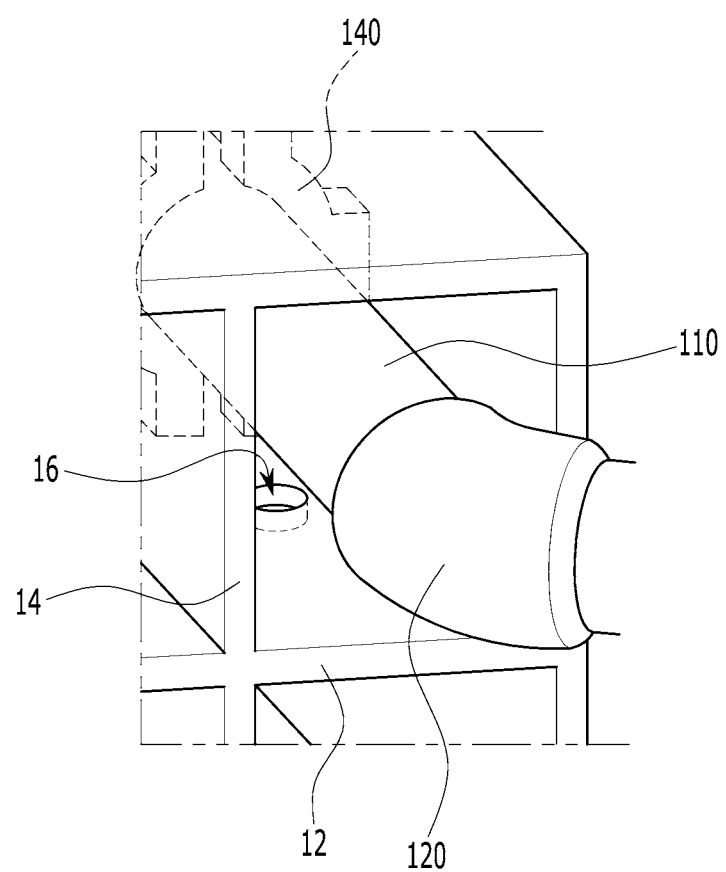
FIG. 4 is an enlarged view of a portion C of FIG. 1.

FIG. 1 is a projection perspective view of a lower vehicle body structure of a vehicle according to various exemplary embodiments of the present invention, FIG. 2 is an enlarged view of a portion one of FIG. 1, FIG. 3 is a cross-section perspective view taken along a line B-B of FIG. 2, and FIG. 4 is an enlarged view of a portion C of FIG. 1.

Referring to the drawing, a lower vehicle body structure of a vehicle according to various exemplary embodiments of the present invention forms a lower vehicle body by providing a pipe unit through which a working fluid such as a coolant or refrigerant flows.

For this, the lower vehicle body structure of the vehicle according to various exemplary embodiments of the present invention, as shown in FIG. 1 and FIG. 2, may include a side member 10, a connecting member 20, and at least one pipe unit.

First, the side member 10 extends in the longitudinal direction of the vehicle, and may be mounted on both left and right sides in the width direction of the vehicle.

The connecting member 20 may be connected to the side member 10 at the front or rear, based on the front and rear directions of the vehicle.

Here, the side member 10 and the connecting member 20 may be manufactured through extrusion molding. The side member 10 and connecting member 20 may be formed of an aluminum material.

On the other hand, the side member 10 and the connecting member 20 may respectively include an internal surface toward the inside and an external surface toward the outside, based on the width direction of the vehicle, an upper surface connecting the internal surface and external surface and disposed upwardly in the height direction of the vehicle, and a bottom surface connecting the internal surface and the external surface and disposed downwardly in the height direction of the vehicle.

A closed cross-section may be formed inside the side member 10 and the connecting member 20 by the internal surface, external surface, upper surface, and bottom surface.

The closed cross-section may be formed in a generally square shape, but any shape may be used as long as it may form the closed cross-section.

In the exemplary embodiment of the present invention, the pipe unit may be provided inside in the longitudinal direction of the side member 10 or the connecting member 20 so that the working fluid flows.

The pipe unit may connect an air conditioner provided in an electric vehicle or each constituent element of the cooling apparatus. Accordingly, the pipe unit may flow the coolant or refrigerant circulated in the cooling apparatus or the air conditioner.

Furthermore, the pipe unit may be connected to various electrical components provided in the electric vehicle or the driving device, and by circulating the working fluid to the electrical components or the driving device, the temperature of the electrical component or the driving device may be controlled.

Here, the pipe unit may include at least one pipe member 110, a pipe connecting member 120, and a length variable member 130.

First, the pipe member 110 is composed as at least one, and the cross-section is formed into a circular hollow.

This pipe member 110 may be provided inside the side member 10 or the connecting member 20.

The pipe connecting member 120 is mounted at a position where the pipe member 110 is respectively connected so that the side member 10 mutually connected to be inclined and the pipe members 110 respectively provided inside the connecting member 20 are mutually connected.

Also, the length variable member 130 is coupled to the pipe member 110 through the pipe connecting member 120. The length variable member 130 may have a variable length.

Here, the length variable member 130 may include at least one bending portion 132 and a bellows portion 134 formed in one among at least one bending portion 132 or one bending portion 134 or more and having the length which is variable.

That is, the length variable member 130 configured as described above has the variable length and position through the bending portion 132 and the bellows portion 134 according to the position of the air conditioner, the constituent elements of the cooling apparatus, or the driving device.

On the other hand, in the exemplary embodiment of the present invention, the side member 10 or the connecting member 20 may further include at least one fixing member 140 provided inside in the longitudinal direction of the side member 10 or the connecting member 20 to fix the pipe member 110 inside.

The fixing member 140 may be disposed to be separated at a predetermined interval in the longitudinal direction of the pipe member 110 inside the side member 10 or the connecting member 20.

This fixing member 140 is wrapped around the external circumference of the pipe member 110 and fixed, preventing the pipe member 110 from directly contacting with the interior of the side member 10 or the connecting member 20 and stably fixing the pipe member 110.

Accordingly, the pipe member 110 may be previously prevented from being damaged by contact with the interior of the side member 10 or the connecting member 20 due to external impact, etc.

Furthermore, the side member 10 or the connecting member 20, as shown in FIG. 3, may have the inside partitioned by at least at least one rib so that the pipe unit is positioned.

At least at least one rib may be provided inside the closed cross-section of the side member 10 or the connecting member 20.

That is, in the at least one rib, a transverse rib 12 extending in the width direction and a longitudinal rib 14 extending in the height direction may be integrally provided inside the closed cross-section of the side member 10 or the connecting member 20.

The transverse rib 12 may connect the inside and the outside of the side member 10 or the connecting member 20 based on the width direction of the vehicle.

The longitudinal rib 14 may connect the upper and lower portions of the side member 10 or the connecting member 20 based on the height direction of the vehicle.

Furthermore, the transverse rib 12 and the longitudinal rib 14 may be formed to cross each other. Four closed spaces may be formed inside the closed cross-section by the transverse rib 12 and the longitudinal rib 14.

The pipe member 110 included in the pipe unit is provided in one or more closed spaces among the closed spaces.

Here, in one among the side member 10, the connecting member 20, the transverse rib 12, or the longitudinal rib 14, as shown in FIG. 4, at least one exhaust hole 16 may be formed to exhaust condensed water generated by a temperature difference in the pipe unit to the outside.

The exhaust hole 16 prevents the condensed water generated on the surface of the pipe unit from being collected inside the side member 10 or the connecting member 20, preventing the side member 10 or the connecting member 20, or the pipe unit, from being corroded by the condensed water.

Therefore, according to the lower vehicle body structure for the vehicle according to various exemplary embodiments of the present invention configured as described above, the pipe unit through which the working fluid such as the coolant or refrigerant flows is provided inside the side member 10 or the connecting member 20 to configure the lower vehicle body, it is possible to prevent the interference occurrence between the pipes and the parts provided in the vehicle in advance, the selection of the path of the pipe becomes advantageous, and the layout of the pipe may be simplified.

Furthermore, the present invention may be commonly applied to vehicle types that use the same lower vehicle body, and a bracket that was applied according to the path of the pipe to fix the conventional pipes may be minimized, while a separate bracket fixing work is not required, the application of the automated process may be possible.

Furthermore, since the present invention does not require securing a pipe installation space, sufficient space for mounting a battery may be secured, and it may be applied to a large capacity battery.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A lower vehicle body structure of a vehicle, the structure comprising:
   a side member extending in a longitudinal direction of a vehicle, disposed on a first side and a second side in a width direction of the vehicle, and having a closed cross-section formed therein;
   a connecting member connected to the side member at a front or a rear based on front and rear directions of the vehicle and having a closed cross-section formed therein; and
   at least one pipe unit provided in the longitudinal direction of the side member or inside the connecting member to inflow a working fluid therein,
   wherein the at least one pipe unit includes:
   at least one pipe member formed in a hollow shape and provided inside the side member or the connecting member;

a pipe connecting member mounted at a position to which the at least one pipe member is connected; and a length variable member coupled to the at least one pipe member through the pipe connecting member and having a variable length.

2. The lower vehicle body structure of the vehicle of claim 1, wherein the length variable member includes:

at least one bending portion; and a bellows portion formed on one or more bending portions among the at least one bending portion and having a variable length.

3. The lower vehicle body structure of the vehicle of claim 1, wherein the side member or the connecting member further includes at least one fixing member provided in the longitudinal direction of the side member or inside the connecting member to fix the at least one pipe member.

4. The lower vehicle body structure of the vehicle of claim 1, wherein the side member or the connecting member is extruded and molded.

5. The lower vehicle body structure of the vehicle of claim 1, wherein the side member or the connecting member has an interior which is partitioned by at least one rib so that the at least one pipe unit is disposed therein.

6. The lower vehicle body structure of the vehicle of claim 5, wherein the at least one rib includes:

a transverse rib connecting an inside and an outside of the side member or the connecting member based on the width direction of the vehicle; and a longitudinal rib connecting an upper portion and a lower portion of the side member or the connecting member based on a height direction of the vehicle.

7. The lower vehicle body structure of the vehicle of claim 6, wherein the transverse rib and the longitudinal rib are aligned to cross each other.

8. The lower vehicle body structure of the vehicle of claim 7, wherein at least four closed spaces are formed inside a closed cross-section by the transverse rib and the longitudinal rib, and wherein the at least one pipe member is provided in one or more closed spaces among the at least four closed spaces.

9. The lower vehicle body structure of the vehicle of claim 8, wherein the side member or the connecting member further includes at least one fixing member provided in the longitudinal direction of the side member or inside the connecting member to fix at least one pipe member of the at least one pipe unit, wherein at least four closed spaces are formed inside a closed cross-section by the transverse rib and the longitudinal rib, and wherein the at least one fixing member is provided in one or more closed spaces among the at least four closed spaces.

10. The lower vehicle body structure of the vehicle of claim 6, wherein one of the side member, the connecting member, the transverse rib, or the longitudinal rib has at least one exhaust hole formed to exhaust condensed water generated by a temperature difference to an outside from the at least one pipe unit.

* * * * *